United States Patent [19]

Pierpoline et al.

[11] 4,152,032
[45] May 1, 1979

[54] PRESSURE-FED JOURNAL BEARING

[75] Inventors: Mario F. Pierpoline, Media; Bernard M. Haug, Ridley Township, Delaware County, both of Pa.

[73] Assignee: Westinghouse Electric Corp., Pittsburgh, Pa.

[21] Appl. No.: 844,153

[22] Filed: Oct. 21, 1977

[51] Int. Cl.² .............................................. F16C 33/72
[52] U.S. Cl. ..................................... 308/36.3; 308/78; 308/122
[58] Field of Search ................... 308/36.3, 76, 77, 78, 308/121, 122, 9, 240

[56] References Cited

U.S. PATENT DOCUMENTS

| 2,098,121 | 11/1937 | Wilkinson | 108/36.3 |
|---|---|---|---|
| 2,283,022 | 5/1942 | Wallgren | 308/36.3 |
| 2,853,346 | 9/1958 | Spangenberg | 308/121 |
| 3,017,229 | 1/1962 | Dilworth | 308/122 |
| 3,743,367 | 7/1973 | Raimondi | 308/122 |

FOREIGN PATENT DOCUMENTS 342057  1/1931  United Kingdom ..................... 308/121

Primary Examiner—Charles E. Frankfort
Attorney, Agent, or Firm—F. A. Winans

[57] ABSTRACT

A pressure-fed journal bearing for a steam turbine is shown having a generally tangentially oriented oil inlet discharging at the horizontal centerline of the supported shaft to utilize the pressure head of the oil and retain laminar flow in the direction of rotation of the shaft. Seals are disposed in the axial ends of the bearing to minimize end leakage and confine the oil flow to an outlet channel generally opposite the inlet and likewise tangentially oriented to receive the discharged oil with minimal bearing losses. The oil flow rate through the bearing can be regulated by an orifice in the outlet or inlet channel.

6 Claims, 6 Drawing Figures

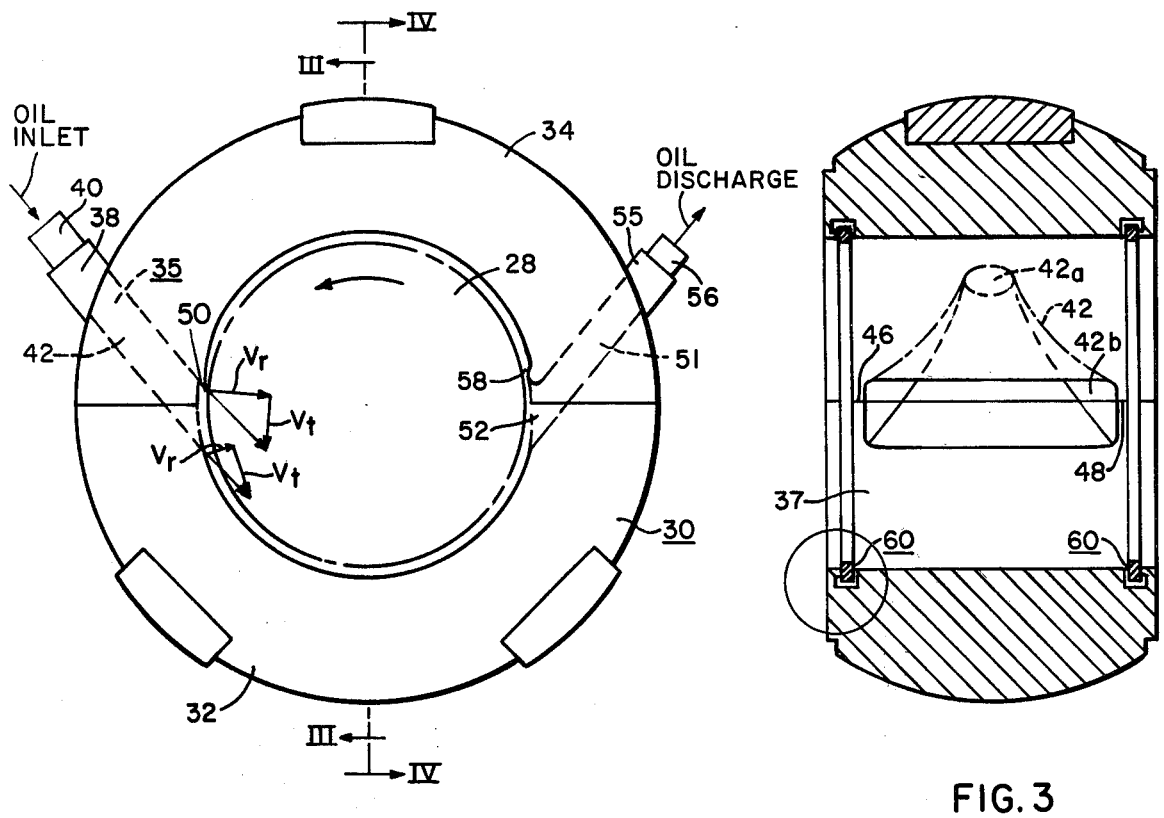
FIG. 2
FIG. 3
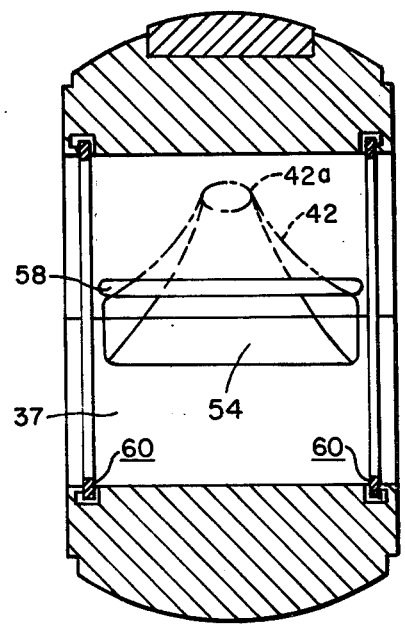
FIG. 4

PRESSURE-FED JOURNAL BEARING

BACKGROUND OF THE INVENTION

1. Field of the Invention

The invention relates to a pressure-fed journal bearing such as commonly used in a steam turbine or gas turbine engine.

2. Description of the Prior Art

The oil fed to a journal bearing in addition to decreasing the friction between the shaft and the bearing surface also removes heat from the bearing. There are generally a plurality of such bearings in a steam turbine unit which are commonly fed from an oil manifold, pressurized to maintain a sufficient quantity of flow through each bearing to remove the heat generated therein and provide the necessary lubrication.

There are several well known journal bearing designs, with each design generally having certain advantages. One well known phenomena associated with journal bearings is referred to as oil whip and generally is a form of vibration of the journal or shaft within the bearing due to turbulent oil action. To minimize oil whip, there are various bearing designs that tend to force or maintain the journal close to the center of the bearing to prevent such movement.

A presently used bearing design of the assignee of this application provides a journal bearing wherein an oil film is maintained over the 360° interface of the shaft and the bearing surface. The oil inlet for this bearing is in a quadrant diametrically opposed to the quadrant of minimum oil film thickness determined by the load and direction of rotation. It is felt the inlet pressure of the oil on the journal, in concert with the load and direction of rotation will effectively reduce the oil whip to an acceptable level. However, in so doing, the oil is introduced in a radial direction to impinge upon the journal or upon the shaft in an area wherein there is no necessity for an oil film thickness for lubrication. Thus, in addition to the pressure of the manifold being maintained to deliver a sufficient quantity of oil at a generally high pressure inlet condition, additional work must be done by the shaft to transport the oil to the lower portion of the bearing where it is necessary to establish a lubricating film between the bearing and the shaft therein.

It is known that a partial arc sleeve, i.e. a journal bearing wherein the cover is relieved because it has no load carrying ability, has less bearing losses. Further, it is common in journal bearings to introduce the oil generally at the center of the bearing from whence it flows axially in both directions to circumferential troughs adjacent the bearing ends for drainage to a reservoir. This then determines that the oil film pressure is a maximum at the axial center and decreases axially in both directions to approach zero at the ends. Thus, in the axial direction, the journal or shaft is supported by a maximum oil film of limited axial extent.

SUMMARY OF THE INVENTION

The present invention provides a pressure-fed journal bearing having an oil inlet at substantially the horizontal center and oriented in substantially a tangential direction with respect to the rotation of the journal whereby the oil inlet provides laminar flow in the direction of rotation to reduce inlet losses. An oil outlet is provided generally diametrically opposed to the inlet and again in a substantially tangential relationship to receive the discharged oil with minimal losses and providing a partial-arc film thereby decreasing the bearing losses by reducing the oil flow in the cover and also reducing the recirculation flow to a minimum in the top half.

Further, the ends of the bearing are sealed to define an oil film supporting the journal substantially across the axial extent of the bearing so that all the oil that enters the bearing passes through the minimum clearance or maximum pressure contact point of the bearing. Thus, all oil is used for lubrication.

In this manner, the laminar flow at the inlet in addition to the maintenance of an oil film substantially throughout the axial extent of the bearing plus the reduction of the oil film to a partial arc permit reducing the oil inlet pressures so that less manifold pressure and smaller pumps in the oil delivery system are required, also permitting reducing the work done on the oil by the shaft to reduce the bearing losses and also the temperature increase within the oil so that less oil flow is necessary to absorb an equivalent amount of heat from the bearing thereby again reducing pump and oil requirements. The end result is a more efficient bearing providing better support to the shaft in a manner that minimizes oil whip with less pump capacity and thereby requiring smaller oil reservoir and less total oil in the entire system.

In addition, the oil outlet has an orifice for metering the flow of oil through the bearing so that if there is a bearing failure the bearing is never starved of oil delivery.

BRIEF DESCRIPTION OF THE DRAWINGS

FIG. 2 is a view similar to FIG. 1 of the bearing of the present invention;

FIG. 3 is a view generally along lines III—III of FIG. 2 showing the oil inlet of the present invention;

FIG. 4 is a view similar to FIG. 3 showing the oil discharge surface of the bearing of the present invention;

DESCRIPTION OF THE PREFERRED EMBODIMENT

The present invention as previously mentioned is directed primarily to the delivery and discharge of the pressurized oil for a journal bearing of the type used in large rotating apparatus such as steam turbines or a gas turbine engine. In these applications, there are generally a plurality of such journal bearings supporting the turbine shaft with pressurized lubricating oil delivered to all bearings from a common supply. As one function of the oil is to remove the heat from the bearing in addition to providing a film between the rotating shaft and the bearing surface, the oil distribution network must also include means for cooling the oil externally of the bearing. Also, in such environment it is not uncommon to require an oil reserve in a reservoir comparable to five times the quantity of oil delivered per minute to all bearings.

It is obvious that by decreasing the necessary rate of oil for each bearing all components of the oil delivery network, i.e. the pump, cooler, storage tank, can be reduced in size and power consumption to the end that a more efficient turbine is provided.

Figure 1:
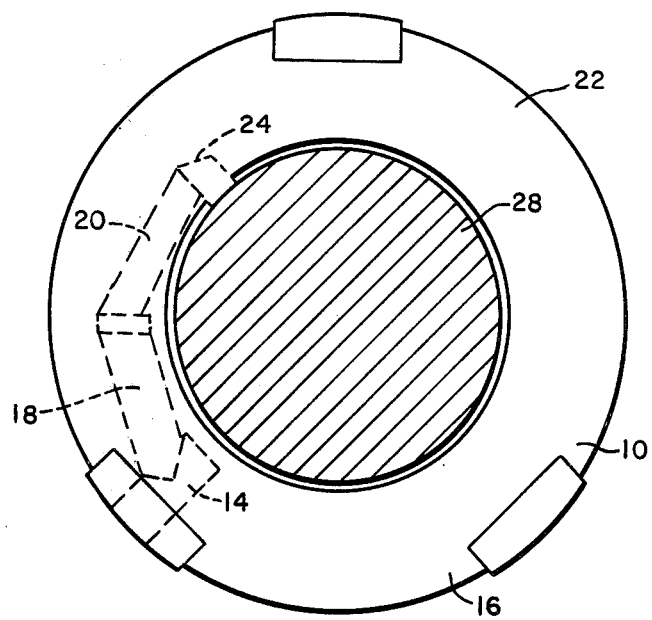
FIG. 1 is a schematic view of a present pressure fed journal bearing.

Reference is now made to FIG. 1, to show, generally schematically, a pressure-fed journal bearing presently used in such applications by the assignee of the present invention. As therein seen, the oil inlet to the bearing 10 includes a channel 14 extending generally radially from the exterior of the base portion 16 of the horizontally split bearing, and communicating with an upwardly extending channel 18 in the base portion leading into a similarly upwardly extending channel 20 in the cap portion 22 to finally be discharged through a portion 24 extending radially to the inner surface 26 of the cap portion. It is noted that this inlet path subtends approximately one-fourth of the bearing structure and is useful in removing heat therefrom. However, portion 24 of the inlet is seen to discharge the pressurized oil in an upper quadrant of the bearing and at a radial direction i.e. perpendicular to the surface of the shaft 28. It is not uncommon for the surface of the shaft to have velocity of approximately 200 ft. per second with the oil inlet velocity on the order of 5 to 7 ft. per second. This large discrepancy between the velocity of the oil and the velocity of the shaft, along with the necessity of the abrupt change in direction of the flow of the oil from perpendicular to the shaft to a circumferential direction as pumped by the shaft, introduces turbulence into the oil, which upon occasion can cause cavitation therein leading to instability in the bearing. Further, it is recognized that that portion of the oil film above the horizontal centerline of the bearing provides no support for the shaft and only requires work to be done on the oil by the rotating shaft to pump the oil to the lower portion where it assumes the well known wedge-shaped film support for lubricating the bearing.

Typically, a journal bearing such as shown in FIG. 1 permits axial leakage of the oil to circumferential grooves adjacent each axial end of the bearing surface which is in communication with outlet ducts through the base for delivery back into the oil supply system. Such grooves and ducts are shown in U.S. Pat. No. 3,743,367 of common assignee. In this regard the oil film pressure has a maximum at the axial center between the grooves with the pressure gradually diminishing from the maximum to zero at the grooves, thereby providing a limited axial support of the shaft.

For the present invention reference is made to FIG. 2 wherein a similar journal bearing 30 is shown having a base 32 and a cap portion 34. In the present invention it is noted that the oil inlet 35 extends through the bearing in an angular direction with respect to a radial line at the point of entry to the inner surface 37. This angular direction is such that the tangential velocity vector $V_t$ of the oil is at least as great, and for the most part substantially greater, than the radial velocity vector $V_r$, as shown in the two extreme vector diagrams of this figure, and that the tangential velocity vector $V_t$ is in the direction of rotation of the shaft 28. Further, the inlet opening into the inner bearing surface is at approximately the horizontal centerline.

Thus, structurally, the oil inlet comprises a tube 38 on the outer surface of the bearing structure which may or may not include an orifice inlet opening 40 and angularly disposed to be concentric to a channel 42 extending angularly from the outer surface to the inner bearing surface 37 so that the oil flowing therethrough will enter the space between the inner bearing surface and the shaft in generally a tangential direction and in the direction of rotation of the shaft in the manner explained above.

Further, the inner terminal end or opening of the channel 42 is, for the most part, below the horizontal centerline thereby utilizing the pressure head of the pressurized oil to deliver the oil to that portion of the bearing where it immediately provides support for the shaft.

It is seen from FIG. 3 that the oil inlet channel 42 is gradually tapered from a circular configuration 42a at the outer surface of the bearing to an axially elongated oval configuration 42b at the inner bearing surface extending over a substantial portion of the axial length of the bearing (i.e. at least 60%) leaving axial land 46, 48 on each side separating the oval opening from the ends of the bearing.

Referring again to FIG. 2 it is to be noted that preferably, the inner surface of the bearing immediately above the inlet opening at the inner surface protrudes inwardly as at 50 such that it defines a reduced narrow space between the rotating shaft and this bearing surface area to prevent oil flow upwardly against the direction of rotation of the shaft, which flow in such a direction would require a sharp reversal from the flow at the inlet direction and could, if permitted, induce eddy currents or turbulence in the flow.

Still referring to FIG. 2, it is seen that an outlet or discharge channel 51 extends angularly from the inner bearing surface 37 to the outer surface and defines substantially a mirror image of the above-described inlet channel 42 to the extent that the oil film pumped by the rotating shaft is discharged in generally a tangential direction into the outlet opening 52 at the inner surface of the bearing. Again, the outlet opening 52 defines an axially elongated oval configuration 54 (see FIG. 4) extending across the major portion of the axial length of the bearing to receive oil as pumped by the shaft. The outer surface of the bearing has an angularly disposed outer tube 55 concentric with the channel 52 terminating in an adjustable outlet orifice 56 for regulating the oil flow through the bearing. The outlet opening 52 is, for the most part, adjacent or immediately below the horizontal centerline of the bearing so that it is not necessary for the pumping action of the rotating shaft to deliver or to pump it beyond the midpoint where it serves no purpose of providing a supporting film between the shaft and the bearing surface. To insure the oil is discharged at this area, a close tolerance provided as by protrusion 58 between the shaft and the inner bearing surface just above the outlet opening to effectively limit to a minimum any carryover of the oil beyond this point. (Also shown in FIG. 4.)

Figure 5:
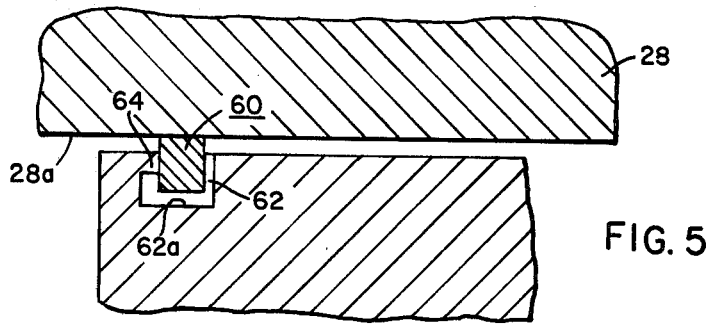
FIG. 5 is an enlarged view of the circled area of FIG. 3.

To minimize the leakage of the oil through the axial ends of the bearings, the circumferential troughs or grooves heretofore used to collect such leakage oil according to the present invention contain a hydraulic sealing means 60 as best seen in FIG. 5. Such hydraulic sealing means comprise a sealing ring disposed in the troughs 62 in close tolerance with the shaft surface 28a. The troughs define an axially outwardly disposed inwardly projecting lip 64 against which the oil film pressure acting against the sealing ring 60 provides a sealing engagement between the ring and the projection. Further, the ring is elevated somewhat above the base 62a of the trough permitting hydraulic pressure against the bottom of the sealing ring 60 to maintain it in sealing engagement with the face 28a of the shaft. However, it is recognized that a limited oil leakage will occur at this point so that the pressure of the supporting oil film will be, at least at these axial extremities, somewhat less than at the inboard portion of the bearing.

Figure 6:
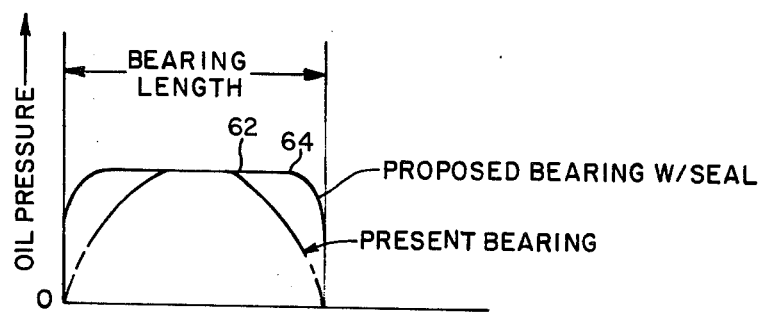
FIG. 6 is a graphical representation of oil film pressure along the axial extent of the bearing of the present invention.

Reference is now made to FIG. 6 to graphically illustrate the oil film pressure supporting the shaft along the axial extent of the bearing of the present design as compared to the prior art journal bearing having axial leakage.

As previously stated, with axial leakage at either end of the bearing, the maximum oil pressure is midway between the ends and gradually decreases to zero at the end leaving a relatively small axial length of the shaft which is supported by the oil, and represented by the dashed curve 62 line of the graph of FIG. 6. In the present invention, with the seals effective to limit discharge of the oil to substantially the outlet opening 52, and limiting the axial leakage, the maximum oil pressure is maintained across a greater axial dimension, as depicted by the solid line 64 and generally coaxial with the axial extent of the inlet opening, to provide substantially greater axial support of the shaft, thereby providing greater stability to the bearing.

Thus, the pressurized journal bearing of the present invention provides an inlet, angled with respect to the surface of the shaft within the bearings so that the inlet direction is generally tangential to the rotor shaft and in the direction of rotation so that the velocity head of the oil can be utilized in assisting the shaft to establish an oil film therebetween in a generally laminar flow minimizing instability which causes turbulence at the inlet. The inlet is also seen to be axially enlarged to permit the oil to be diffused uniformly across the whole axial width of the shaft. Further, no unnecessary work is done on the oil that would elevate its temperature in that the oil is delivered to that portion of the bearing requiring the oil film for separation of the shaft in the bearing surface. Finally, the outlet flow is regulated to maintain a sufficient oil pressure across the axial length of the shaft to increase the stability of the support thereof. It is felt that in this manner, the heat buildup of the oil is reduced and the amount of oil required to support the shaft is also reduced, thereby reducing the quantity of oil necessary to be delivered to the bearing which in turn permits a sizable reduction in the capacity and power requirements of the previously mentioned associated parts. Further there are less bearing losses (as less oil is required to be pumped) and greater stability of the shaft support in the bearing.

We claim:

1. A journal bearing comprising a sleeve having an axial extending opening enclosing an axial portion of a shaft for rotation therein, said sleeve having an oil inlet to said opening and an oil outlet from said opening for circulating oil through said bearing; and wherein said inlet and outlet are disposed generally diametrically opposed along the horizontal centerline of said opening; with the axis of said inlet and outlet being angularly disposed with respect to said horizontal centerline so as to deliver and receive the oil between said shaft and said sleeve in a direction having a component tangential to said shaft and in the same direction as the rotation of said shaft to provide substantially laminar flow in the direction of rotation of said shaft to reduce inlet and outlet losses and minimize oil whip, and means for substantially sealing the opposed axial ends of said sleeve against said shaft to minimize leakage of oil for said bearing at said ends whereby substantially all oil entering said bearing exits through said outlet only after having passed the arcuate distance between the opening and said shaft from said inlet to said outlet.

2. Bearing structure according to claim 1 wherein the inlet to said opening extends substantially across the axial extent of said sleeve.

3. Bearing structure according to claim 1 wherein the outlet from said opening extends substantially across the axial extent of said sleeve.

4. Bearing structure according to claim 3 wherein the surface defining said opening protrudes toward said shaft adjacent the downstream side of said outlet to form a dam to direct the oil into said outlet.

5. Bearing structure according to claim 4 wherein the outlet contains a metering orifice for regulating the quantity of oil flowing through said bearing.

6. Bearing structure according to claim 1 wherein said angular disposition of said inlet and outlet is such that the tangential flow direction imparted thereby is the major component.

* * * * *